RE 28,966

United
Blockwick

T78894

] E Re. 28,966
] Reissued Sept. 21, 1976

MBS

[54] SYSTEM AND BARRIER FOR CONTAINING AN OIL SPILL

[75] Inventor: Thomas Nicholas Blockwick, McLean, Va.

[73] Assignee: Ocean Systems, Inc., Reston, Va.

[22] Filed: Jan. 24, 1974

[21] Appl. No.: 436,146

Related U.S. Patent Documents

Reissue of:

[64] Patent No.: 3,708,982
Issued: Jan. 9, 1973
Appl. No.: 79,997
Filed: Oct. 21, 1970

[52] U.S. Cl. ..... 61/1 F; 61/5; 114/.5 F; 210/83

[51] Int. Cl. ..... E02b 15/04

[58] Field of Search ..... 61/1 F, 5; 114/.5 F; 210/83, 242, 210 UD; 9/8

[56] References Cited

UNITED STATES PATENTS

| | | | |
|---|---|---|---|
| 3,476,246 | 11/1969 | Dahan | 210/83 |
| 3,592,008 | 7/1971 | Trindle | 61/1 A |
| 3,653,213 | 4/1972 | Childers | 61/1 F |

FOREIGN PATENTS OR APPLICATIONS

| | | | |
|---|---|---|---|
| 1,558,927 | 1/1969 | France | 61/1 F |
| 1,028,470 | 5/1966 | United Kingdom | 61/1 A |

*Primary Examiner*—Jacob Shapiro

[57] ABSTRACT

A system for containing an oil spill comprising a plurality of barrier modules each composed of a composite structure having a buoyant upper section and a water absorbing lower section which represents concurrently the sole ballast for said upper section and the subsurface barrier for the module.

19 Claims, 18 Drawing Figures

INVENTOR
THOMAS N. BLOCKWICK
BY
ATTORNEY

SYSTEM AND BARRIER FOR CONTAINING AN OIL SPILL

Matter enclosed in heavy brackets [ ] appears in the original patent but forms no part of this reissue specification; matter printed in italics indicates the additions made by reissue.

This invention relates to a system and barrier for oil spill control and pollution abatement.

Systems presently available for confining an oil slick suffer from their inability to closely conform to the sea surface especially in poor weather. How well a system will follow the surface undulation of the sea depends upon the dynamic properties of the system as well as its weight and flexibility. Although the dynamic response of the system is the most controlling factor, other important factors are: complexity, handling, capability, structural strength, storage life, necessary logistic support, and compatibility for use with existing ships, boats and aircraft.

Accordingly, it is an object of the present invention to provide an oil containment system and barrier which can confine a film of oil, whether thin or relatively thick, to within a predetermined area under the environmental influences of strong winds, waves and currents.

It is a further object of the present invention to provide an oil containment system and barrier which exhibits roll, pitch, and heave characteristics closely approximating the sea conditions affecting the oil spill, thereby responding to, and acting in conformity with, the movements of the sea at the sea surface.

It is yet another object of the present invention to provide an oil containment system and barrier which is rugged yet flexible, has a long storage life with virtually no maintenance required, and is safe to handle in high seas.

Other objects and advantages of the present invention will become apparent from the following detailed description taken in connection with the accompanying drawings.

FIGS. 12a–e illustrate a number of alternative cross-sectional geometries which may be employed for the barrier modules of the present invention.

Figure 1:
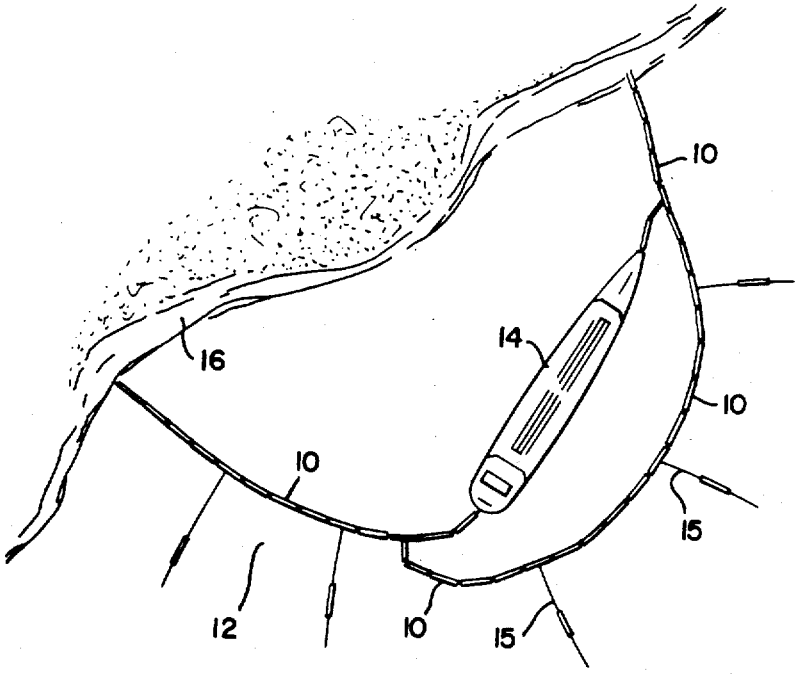
FIG. 1 is a general pictorial showing of the oil containment system of the present invention as placed in position about an oil tanker located off a hypothetical shoreline.
Figure 1A:
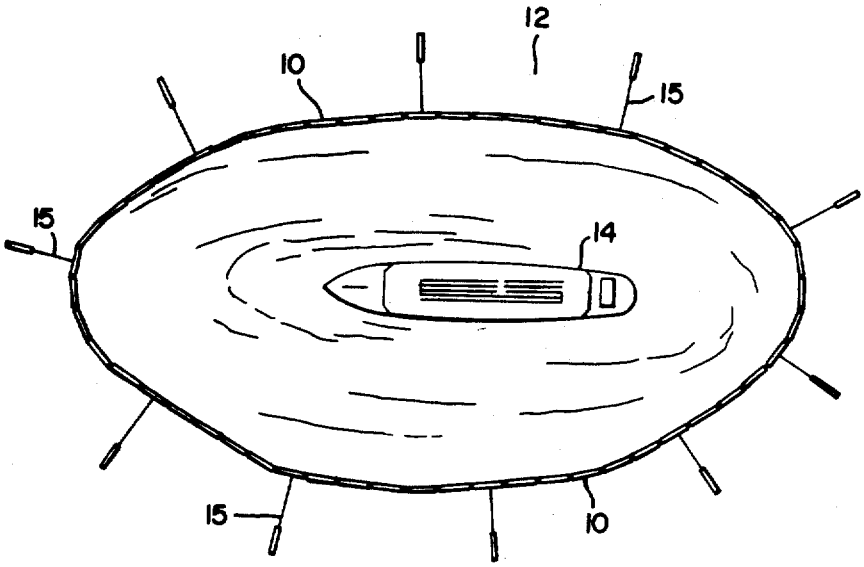
FIG. 1a is another general showing of the oil containment system of the present invention in a moored position located offshore about an oil tanker.

Referring now to FIGS. 1 and 1a, wherein a plurality of individual barrier modules 10 are shown coupled together end to end in a string-like formation to form a barrier system 12 for confining a liquid such as oil to an area determined by the barrier configuration thus formed. FIG. 1 shows an oil tanker 14 off a hypothetical shoreline 16. Tanker 14 is bounded by the barrier modules 10 in such manner as to contain an oil spill to within a relatively small area offshore. In FIG. 1a the barrier modules 10 are shown forming a closed loop about tanker 14. Mooring lines 15 are shown connected to the string of barrier modules 10 in order to maintain the system 12 in a given position.

Each barrier module 10 is a composite structure which, as illustrated in the preferred construction of FIGS. 2–5, inclusive, consists of an upper and lower section 20 and 22, respectively. The upper section 20 extends above the surface of the sea while the lower section 22 represents that part of the structure which protrudes below the surface of the sea and functions concurrently as ballast for the upper section 20 and as the subsurface barrier for the module 10.

Figure 2:
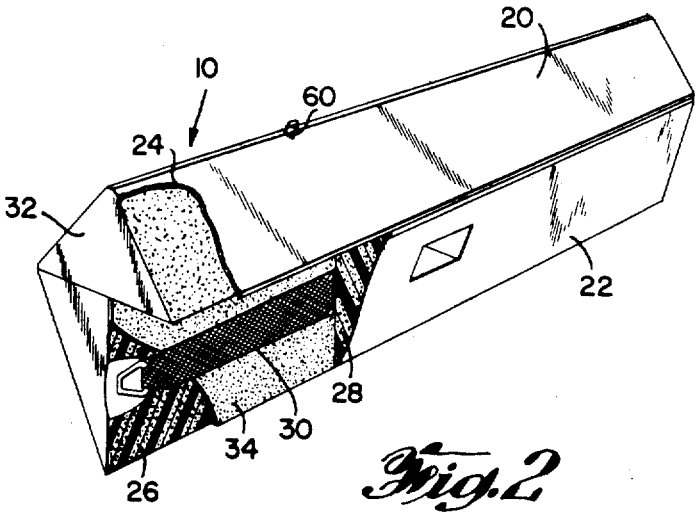
FIG. 2 is a perspective view of one of the barrer modules of FIG. 1 with part of the lower section removed to illustrate the preferred construction thereof.
Figure 12:
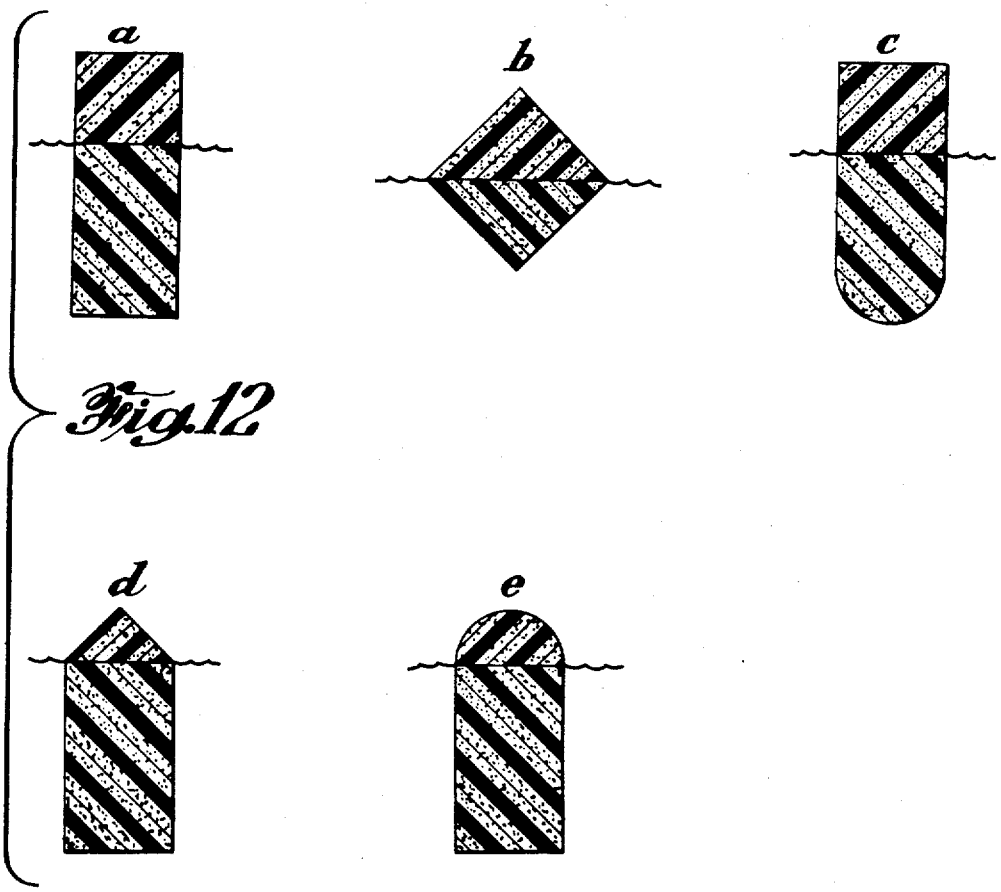
Figure 3:
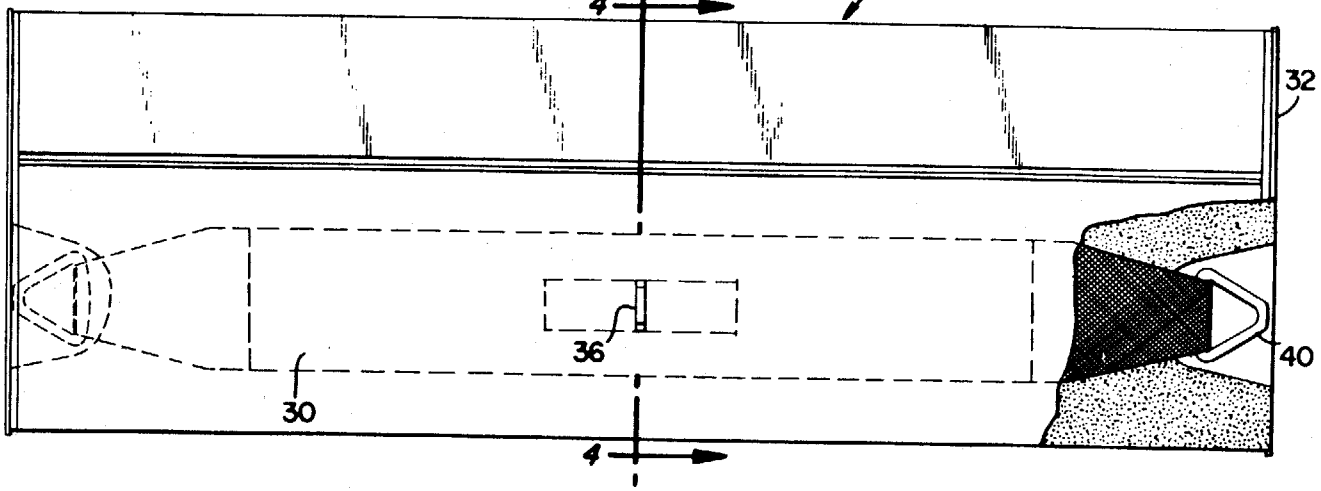
FIG. 3 is a longitudinal elevation of the barrier module of FIG. 2 with one end shown partly in cross section to illustrate the end terminal of the fabric belt.
Figure 5:
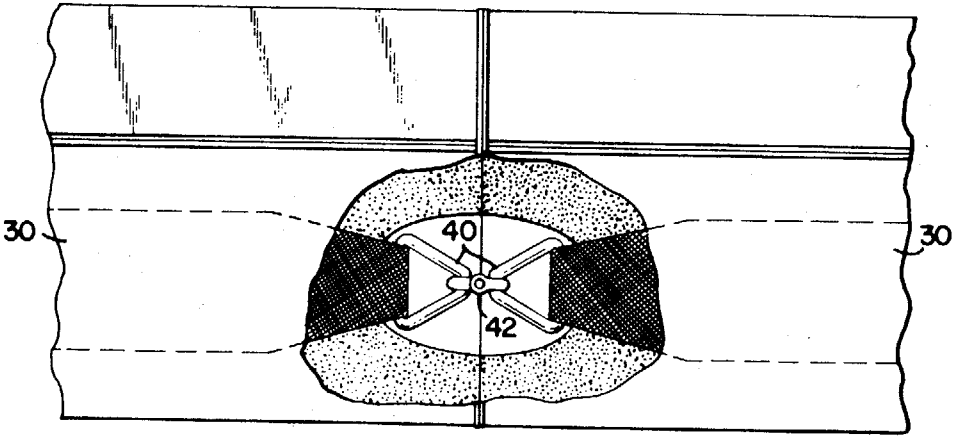
FIG. 5 is a longitudinal elevation of a coupled pair of barrier modules with part of the center portion cut away to illustrate the preferred coupling arrangement for the modules.

The composition and geometry of the upper and lower section 20 and 22, respectively, determines the quality of performance for the barrier module 10. The upper section 20 provides the buoyancy, and functions as the above-surface barrier, i.e. oil barrier, for the module. To perform this operation the upper section 20 should be composed of a high strength but flexible material of low density. Materials such as foam, porous rubber and sponge are suitable, while a polyether based flexible polyurethane foam is most preferred. To maintain its buoyancy the upper section 20 must be water repellant or made to be such. Where a porous foam plastic material is used to form the upper section 20 it may be rendered water impervious by sealing the outer periphery. This is preferably accomplished as is shown in FIG. 2 by applying an appropriate surface coating 24 to prevent fluid from permeating through the porous foam structure. The type of coating employed and the thickness thereof is not critical as long as the coating will prevent oil from passing through the relatively permeable foam. An elastomer may be used for this purpose. A 30 to 60 mil thin film surface coating of elastomer produces a tough, flexible, seawater and petroleum resistant layer which resists abrasion, puncturing, and chemical degradation. The upper section 20 is bonded to the lower section 22 by any conventional water repellant sealing adhesive preferably an epoxy resin or an elastomer. The sealing adhesive should prevent fluid seepage from the lower section 22 into the upper section 20.

The lower section 22 of barrier module 10 functions as the submerged fluid barrier while simultaneously providing the static and dynamic stability for the composite structure. The material selected for the lower section 22 must be water absorbent and should otherwise exhibit similar characteristics to the material selected for the upper section 20 such as flexibility and resiliency, and be light in weight. Once immersed into water the mass of the water-absorbing lower section 22, which is negligible in a dry state, will immediately increase due to entrapped water, thereby providing the necessary ballast for the upper section 20. Thus, the lower section 22 which is essentially weightless in water, but which controls and contains a large mass conveniently provided by the surrounding sea, will exhibit in such state a dynamic response characteristic closely simulating the surface characteristics of the sea itself. The rate at which fluid is absorbed by the lower section 22 is in general proportional to the size and concentration of pores in the structure of the cellular material used in fabricating the lower section as well as the properties of the material itself. Any flexible and permeable foam plastic would be satisfactory, although a reticulated polyether based polyurethane foam is preferred. A reticulated foam can have a relatively large number of pores per linear inch of foam. The foam may be chemically treated to increase its water absorption properties if desired.

The lower section 22 is composed of two symmetrical segments 26 and 28, respectively, and a relatively thin belt-like member 30 interposed between the segments and aligned in the vertical plane which includes the longitudinal axis of the module 10. The belt-like member 30 extends along substantially the entire length of the module 10 and is bonded in such position against adjacent faces of segments 26 and 28 by a sealing adhesive 34 such as an epoxy resin or an elastomer. The sealing adhesive 34 not only cements segments 26 and 28 together but represents in combination with belt 30 a partition for preventing fluid from passing from one segment of the lower section into the other. The belt also provides added strength to enable the module 10 to maintain its structural unity under rough sea conditions. The belt 30 is composed of a fabric material having high strength and low stretch properties, such as those exhibited by dacron.

In addition to providing structural rigidity, the belt 30 is used to join together other barrier modules 10 to form the barrier system 12 of FIG. 1. A terminal fitting or coupling 40 is connected to the belt 30 at each end face 32 of the module 10. A part of the surface of each end face surrounding the coupling element 40 is recessed such that abutting modules will mate to form a relatively liquid-tight seal as exemplified in FIG. 5. An additional sleeve seal may be added if desired. Any two modules are joined together by means of a quick disconnect ring 42 which connects the coupling elements 40. Any number of barrier modules may be coupled together in this manner to form a barrier system 12. The number of modules to be used in a barrier system will depend entirely upon the size of the oil spill to be contained.

Figure 4:
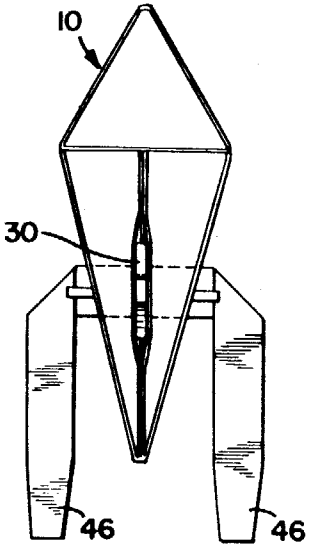
FIG. 4 is a cross-sectional view of the barrier module taken along the lines 4—4 of FIG. 3; and in addition showing a pair of mooring lines joined to the lower section of the module.
Figure 6A:
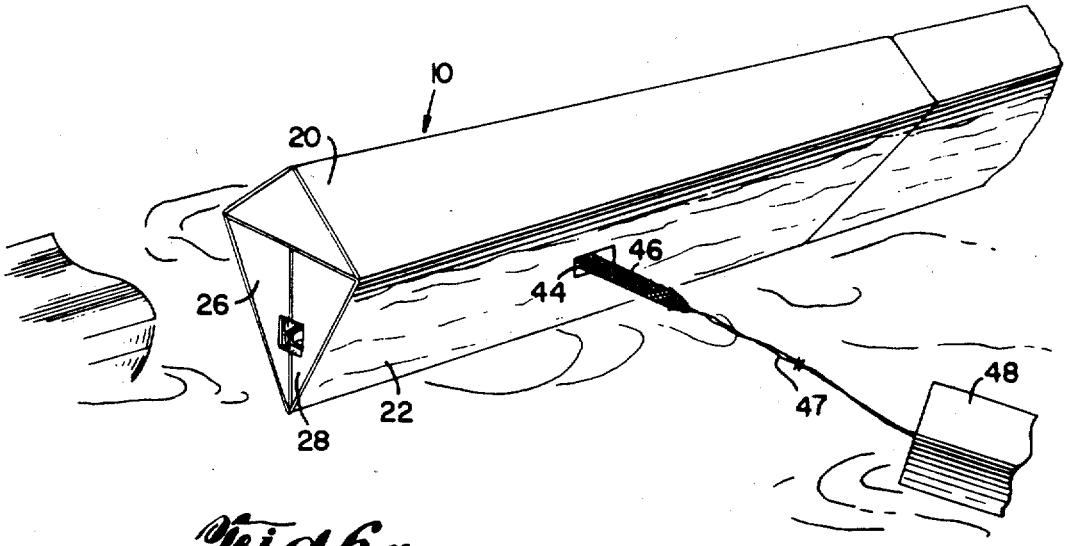
FIG. 6a illustrates a preferred mooring arrangement for the barrier system in which a mooring line, attached to a mooring buoy, is shown coupled to the barrier module at a point located intermediate its ends.
Figure 6B:
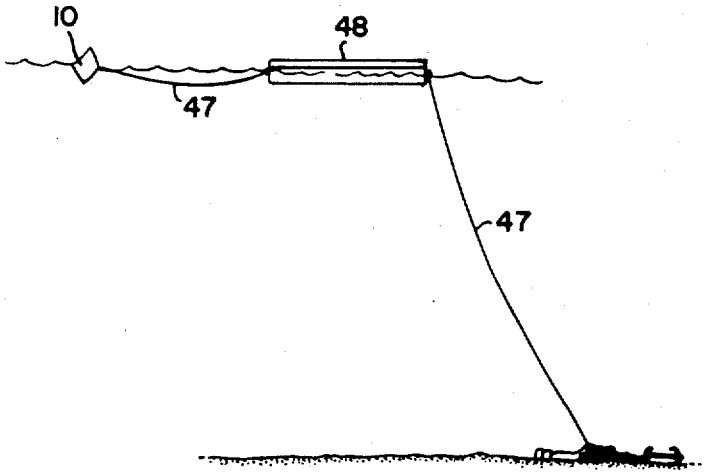
FIG. 6b is another view of the mooring arrangement illustrated in FIG. 6a wherein the buoy is shown anchored to the ocean bottom.
Figure 7:
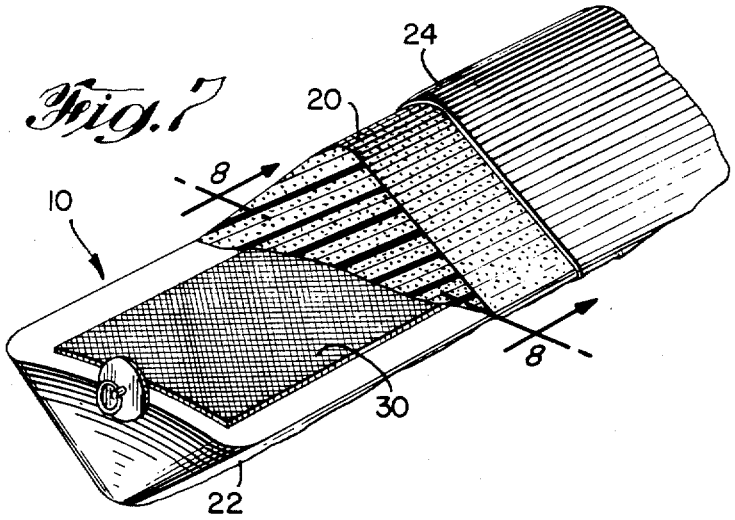
FIG. 7 is a perspective view of an alternate construction for each of the barrier modules shown in FIG. 1.

Although in calm seas the barrier system 12 is effective without mooring, the system lends itself readily to mooring applications. It is preferred that mooring lines be attached directly at the center 36 of the belt 30, intermediate the end faces 32 of module 10, technically known as the center of pressure. For easy access to this location a slit 44 is formed in the wall of the foam plastic module 10, as shown in FIG. 6a, on one or both sides of the lower section 22. Mooring belts 46 may be attached to the belt 30 by any number of conventional techniques. One approach would be to sew the mooring belts 46 directly to the belt 30 at the slotted location 44. In FIG. 4, mooring belts 46—46 are shown joined on opposite sides of the module 10 to the belt 30. By attaching the mooring belts 46—46 at this location, the generation of transverse forces which might otherwise tend to pivot the module, i.e. make it heel over in strong water currents, is minimized. In FIG. 6, a mooring spud 48 is shown coupled to a mooring line 47 which in turn is connected to the barrier module 10 as described above. The mooring spud may be of a foam material similar to the barrier module 10 but should be water repellant. FIG. 6b shows the mooring spud 48 in an anchored position.

The static stability of the module 10 is determined by the relative position between the center of gravity of the composite structure, its center of buoyancy and the water plane area. It has been demonstrated that the module 10 exhibits a high range of static stability. In fact, a positive righting arm throughout the full ± 180° range was shown to exist; that is, the structure always remains upright no matter what wave conditions or forces are imposed. Thus, should the module 10 be raised out of the water and immediately dropped back into it or turned over end for end, a righting moment will develop to reestablish the proper relationship and position for the upper and lower sections 20 and 22, respectively, thereby stabilizing the structure.

The geometry of the module 10 is significant relative to the overall oil containment effectiveness and deployment of the barrier system 12. Various cross-sectional modular shapes have been studies with factors such as size, flexibility, strength, ease of construction and cost taken into consideration along with relative static stability and oil containment capability. The most preferred of all the cross-sectional shapes considered is [ a rhombus ] as shown in FIG. 2 consisting of two isosceles triangles having a common base. In the preferred configuration shown in FIG. 2 the upper triangle, representing the upper section 20 of module 10, has a base-to-apex height approximately [ twice ] *one half* the base-to-apex depth of the lower section 22. The bottom triangle is split to form two further triangles identified earlier as segments 26 and 28, respectively.

Figure 9:
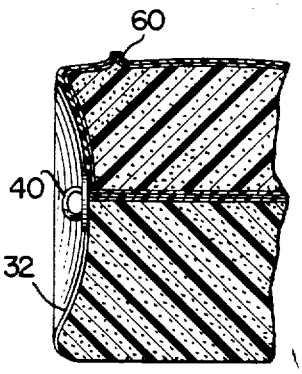
FIG. 9 is a side elevation of the barrier module of FIG. 7 shown in cross section.
Figure 8:
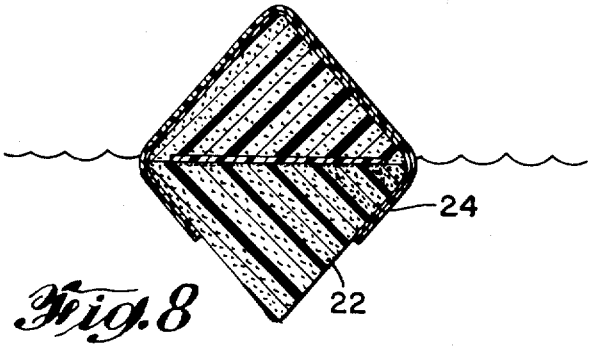
FIG. 8 is a cross section of the barrier module taken along the line 8—8 of FIG. 7.
Figure 11:
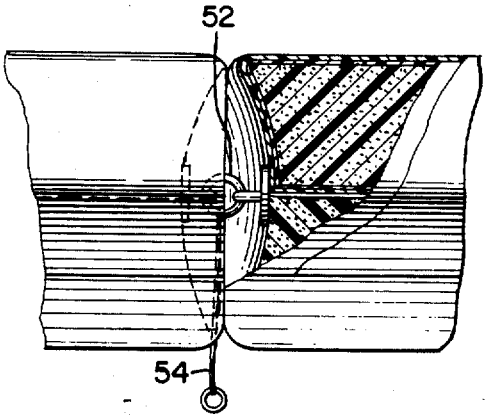
FIG. 11 is a side elevation of a pair of barrier modules shown coupled together with the end portion of one of the modules exposed to illustrate the coupling.
Figure 10:
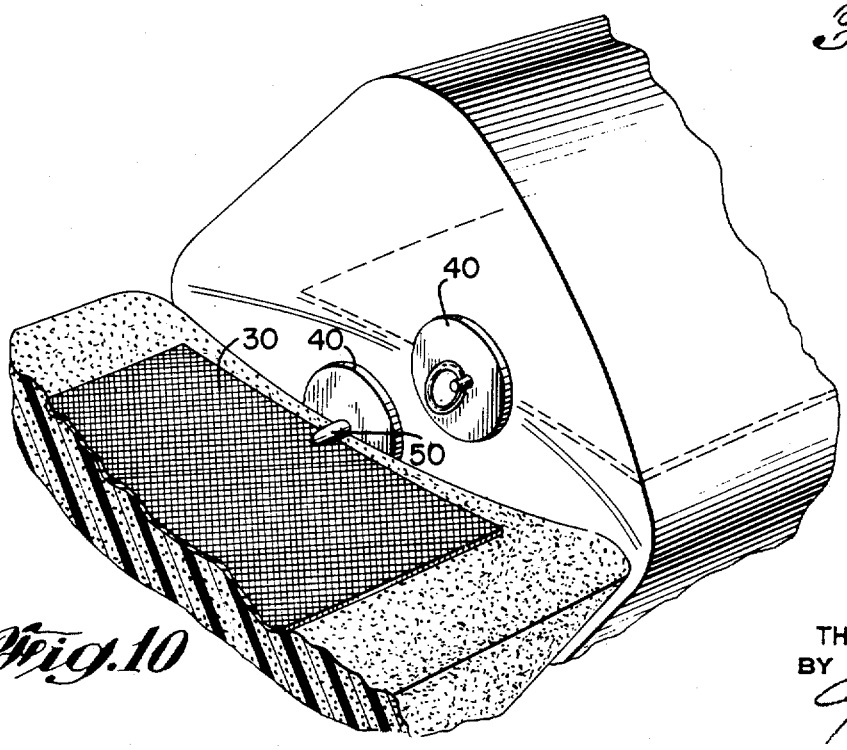
FIG. 10 is a partial perspective view of a pair of barrier modules as illustrated in FIG. 7 which are about to be coupled together.

FIGS. 7–11 inclusive illustrate an alternative but less desirable configuration for module 10. The structural belt 30 in this embodiment is interposed longitudinally between the upper and lower sections 20 and 22, respectively, prior to cementing the sections together. The composition of the segments 20 and 22 and that of the belt 30 is equivalent to their counterparts in FIG. 2. An elastomer coating 24 is applied to the surface of upper section 20 to render it water repellant in the same manner and for the same purpose as explained with reference to the preferred construction shown in FIG. 2. However, in this case the coating is extended as shown in FIG. 8 to cover part of the periphery of lower section 22. The coating on the lower section acts as the subsurface oil barrier. A terminal fitting or coupling 40 is connected to the belt 24 at each end face 32 of the module 10. The end faces 32 of each module 10 are recessed such that only the outer edge of the end faces 28 will abut when the modules are mated. FIG. 9 illustrates the arched contour forming the recess in the end face 32 while FIGS. 10 and 11 illustrate a typical interconnection between a pair of barrier modules 10. Each fitting 40 is located at the approximate center of the recessed end faces 32 and is attached by means such as a tab 50 to the belt 30. Any conventional quick-connect type coupling 52 may be used to couple together the terminal fittings 40. Once engaged the modules 10 butt against each other to form a relatively liquid-tight seal. A pendant 54 may be detachably connected between any pair of modules for handling or mooring purposes. FIGS. 12a–e illustrate yet a number of other cross-sectional alternative geometries.

An ancillary advantage in using flexible foam for the upper and lower sections 20 and 22, respectively, is its ability to be substantially compressed, i.e. reduced in volume for storage and yet when relaxed to expand back to its normal shape. Compression to 25 percent of original volume and greater has been achieved. This results in ease of transportation and economy of storage. Moreover, foam is also easily handled and can be fabricated into any desired shape. A valve 60 may be incorporated to provide a free flow of air in the upper section 20 of barrier module 10 during packaging and deployment as shown in FIG. 9. By this means air may be exhausted during compression and taken in for expansion.

Although each barrier module element 10 is intended primarily to serve as an oil containment barrier, it is obvious that each can be employed individually as a buoy.

What is claimed is:

[ 1. An oil containment barrier module comprising a composite structure having a buoyant, substantially water impervious, upper section and a water absorbent lower section, said lower section when immersed in water representing concurrently the principle ballast for said upper section and the subsurface barrier for the module.]

[ 2. An oil containment barrier module as defined in claim 1 wherein said upper and lower sections are formed from at least one material selected from the class consisting of flexible foam, porous rubber, and sponge, having low density. ]

[ 3. An oil containment barrier module as defined in claim 2 wherein said flexible foam is composed of polyurethane. ]

[4. An oil containment barrier module as defined in claim 3 wherein said upper section is a polyether based polyurethane foam and wherein said lower section is a reticulated polyester based polyurethane foam.]

[ 5. An oil containment barrier module as defined in claim 2 further comprising means for bonding said upper section to said lower section.]

[6. An oil containment barrier module as defined in claim 5 wherein said bonding means is a sealing adhesive selected from the class consisting of epoxy resin and elastomers.]

[ 7. An oil containment barrier module as defined in claim 5 wherein said upper section is encased within a substantially water impervious jacket. ]

[8. An oil containment barrier module as defined in claim 7 wherein said jacket consists of an elastomer surface outer coating. ]

9. An oil containment barrier module [ as defined in claim 7 ] *comprising a composite structure having a buoyant, substantially water impervious, upper section and a water absorbent lower section, said lower section when immersed in water representing concurrently the principal ballast for said upper section and the subsurface barrier for the module, wherein said upper and lower sections are formed from at least one material selected from the class consisting of flexible foam, porous rubber, and sponge, having low density, further comprising means for bonding said upper section to said lower section, wherein said upper section is encased within a substantially water impervious jacket,* wherein said lower section comprises two segments having adjacent surfaces, a relatively thin belt-like member located between said adjacent surfaces and means for bonding said member to said adjacent surfaces.

10. An oil containment barrier module as defined in claim 9 wherein the adjacent surfaces of said segments are substantially parallel to one another and wherein said thin belt-like member is substantially vertically aligned between said parallel surfaces and extends longitudinally along substantially the entire length of the module.

11. An oil containment barrier module as defined in claim 10 wherein said bonding means is a sealing adhesive selected from the class consisting of an epoxy resin and elastomer.

12. An oil containment barrier module as defined in claim 10 further comprising a coupling means connected to said belt-like member at each opposite end thereof and adapted to engage other barrier modules to form a barrier system.

13. An oil containment barrier module as defined in claim 12 wherein the cross-sectional geometry of the composite structure [ is a rhombus consisting of ] *consists* of two isosceles triangles having a common base.

14. An oil containment barrier module as defined in claim 12 further comprising means including a mooring line connected at the center of said belt-like member intermediate the longitudinal surface of said lower section.

15. An oil containment barrier module [ as defined in claim 7 ] *comprising a composite structure having a buoyant, substantially water impervious, upper section and a water absorbent lower section, said lower section when immersed in water representing concurrently the principal ballast for said upper section and the subsurface barrier for the module, wherein said upper and lower sections are formed from at least one material selected from the class consisting of flexible foam, porous rubber, and sponge, having low density, further comprising means for bonding said upper section to said lower section, wherein said upper section is encased within a substantially water impervious jacket,* wherein said jacket partially covers the longitudinal surfaces of said lower section.

16. An oil containment barrier module as defined in claim 15 further comprising a relatively thin belt-like member located intermediate the upper and lower sections along substantially the entire length of the barrier.

17. An oil containment barrier module as defined in claim 16 further comprising coupling means connected at each opposite end of said belt and adapted to engage other barrier modules to form a barrier system.

[ 18. A barrier system for containing an oil spill in a body of water comprising: a plurality of barrier modules coupled together end to end in a predetermined string formation, and at least one mooring line connected to said string of barrier modules for maintaining the relative position of said barrier system within said body of water; each of said barrier modules comprising a composite structure having a buoyant, substantially water impervious upper section and a water absorbent lower section, said lower section representing concurrently the principle ballast for said upper section and the subsurface barrier for the module.]

[19. A barrier system as defined in claim 18 wherein said upper and lower sections of each module are formed from at least one material selected from the class consisting of flexible foam, porous rubber, and sponge having of low density.]

20. A barrier system [as defined in claim 19] *comprising: a plurality of barrier modules coupled together end to end in a predetermined string formation, and at least one mooring line connected to said string of barrier modules for maintaining the relative position of said barrier system within said body of water; each of said barrier modules comprising a composite structure having a buoyant, substantially water impervious upper section and a water absorbent lower section, said lower section representing concurrently the principal ballast for said upper section and the subsurface barrier for the module, wherein said upper and lower sections of each module are formed from at least one material selected from the class consisting of flexible foam, porous rubber, and sponge having of low density*, wherein the lower section of each barrier module is composed of two segments and a relatively thin belt-like member located in a vertical plane between said segments and extending for substantially the entire length of the module.

21. A barrier system as defined in claim 20 further comprising coupling means connected to said belt-like member at each opposite end face of said barrier module.

22. A system as defined in claim 21 wherein the end faces of each barrier module have a recessed surface and wherein said coupling means are connected to said belt-like member within said recessed surface such that upon interconnecting the coupling elements the barrier modules butt against each other to provide a relatively liquid-tight seal.

23. A system as defined in claim 22 wherein said mooring line is connected to the belt-like member in one of the barrier modules of the system at a location intermediate the end faces of the module.

*24. An elongated floating barrier module for use in a system to contain oil spilled on water, said barrier including a buoyant portion filled with a flexible foam and impervious to water, an underwater barrier element supported by said buoyant portion and extending the length of the barrier and downwards from the buoyant portion into the water, and a water absorbing portion made of foam attached to said barrier element which when soaked with water is non-buoyant and provides the principal ballast for said barrier.*

*25. A barrier as in claim 24, said water absorbing portion being formed of reticulated foam.*

*26. A barrier as claimed in claim 25, said underwater barrier element including a sealing coating adhering to said water absorbing portion.*

*27. A barrier as in claim 24 including a stress carrying member running from end to end of said barrier, said stress carrying member having mooring ties attached thereto and being bonded to said water absorbing portion said mooring ties being at the center of pressure of the barrier cross-section.*

*28. A barrier as in claim 27, said stress carrying member having linkages on each end of connecting like barriers together in a string.*

*29. A barrier as in claim 24 further characterized in that said buoyant portion is triangular in cross section, said water absorbing portion is triangular in cross section, and said buoyant and water absorbing portions are bonded to each other along a common base floating horizontally.*

* * * * *